United States Patent
Ahmed

(10) Patent No.: US 11,677,821 B2
(45) Date of Patent: Jun. 13, 2023

(54) INTERNET GROUP MANAGEMENT PROTOCOL HOST TRACKING

(71) Applicant: ARRIS Enterprises LLC, Suwanee, GA (US)

(72) Inventor: Mohammad Nasir Ahmed, Bangalore (IN)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 17/671,689

(22) Filed: Feb. 15, 2022

(65) Prior Publication Data
US 2022/0263895 A1   Aug. 18, 2022

Related U.S. Application Data

(60) Provisional application No. 63/150,653, filed on Feb. 18, 2021.

(51) Int. Cl.
G06F 15/173 (2006.01)
H04L 67/104 (2022.01)
H04L 65/611 (2022.01)
G06F 15/16 (2006.01)

(52) U.S. Cl.
CPC ........ *H04L 67/1046* (2013.01); *H04L 65/611* (2022.05); *H04L 67/1051* (2013.01)

(58) Field of Classification Search
CPC . H04L 67/1046; H04L 65/611; H04L 67/1051
USPC .......................................................... 709/231
See application file for complete search history.

(56) References Cited

U.S. PATENT DOCUMENTS

| | | | |
|---|---|---|---|
| 6,977,891 B1 | 12/2005 | Ranjan et al. | |
| 8,880,737 B1* | 11/2014 | Bell | H04L 65/611 |
| | | | 709/227 |
| 2007/0011350 A1 | 1/2007 | Lu et al. | |
| 2013/0128886 A1 | 5/2013 | Shah | |
| 2016/0345054 A1* | 11/2016 | Dhaipule | H04N 21/6405 |

FOREIGN PATENT DOCUMENTS

EP    1359709 A2    11/2003

OTHER PUBLICATIONS

"European Search Report in corresponding patent application No. 22157255.5 dated Jun. 28, 2022, 9 pages".

* cited by examiner

*Primary Examiner* — Karen C Tang
(74) *Attorney, Agent, or Firm* — Steven Stupp; Stewart Wiener

(57) ABSTRACT

A computer network device (such as a switch or a router) that implement host tracking is described. During operation, the computer network device may receive a report message that is associated with a host, which indicates that the host wants to join a group in a network that receives an audio-video channel from a source. In response, the computer network device may add information associated with the host to a group data structure associated with one or more hosts in the group. Then, when the computer network device receives a leave message that is associated with the host, the computer network device may remove or deactivates the host from the group data structure. Moreover, when the group data structure is empty or has no active hosts, the computer network device may stop forwarding the audio-video channel from the source to the group without further delay.

20 Claims, 7 Drawing Sheets

INTERNET GROUP MANAGEMENT PROTOCOL HOST TRACKING

CROSS REFERENCE TO RELATED APPLICATIONS

This application claims priority under 35 U.S.C. 119(e) to: U.S. Provisional Application Ser. No. 63/150,653, "Internet Group Management Protocol Host Tracking," filed on Feb. 18, 2021, by Mohammad Nasir Ahmed, the contents of which are herein incorporated by reference.

FIELD

The described embodiments relate to techniques for tracking hosts in a network by computer network devices (such as routers and/or switches) using Internet group management protocol version 2 (IGMPv2) host tracking.

BACKGROUND

There is increasing demand for Ethernet technology in audio-video applications. However, given the bandwidth constraints in many audio-video applications, audio-video traffic often needs to be intelligently forwarded on network links. For example, a network administrator may need to carefully plan to provision bandwidth based on the maximum number of audio-video channels supported in a network. This because the network may not be able to support unnecessary traffic on any of the links in any circumstances. Indeed, when there is unnecessary or unexpected traffic associated with a user, the audio-video quality of other users may be immediately adversely affected.

IGMP is a communications protocol used by hosts and adjacent computer network devices in Internet Protocol (IP) networks to establish multicast group memberships. IGMP facilitates IP multicast and allows the network to direct multicast transmissions to hosts that have requested them.

Moreover, 'IGMP snooping' is a process of listening to IGMP network traffic to control delivery of IP multicasts. Notably, IGMP Snooping is used to intelligently forward an audio-video channel (multicast) within a network. Computer network devices use IGMP snooping to detect or listen in on the IGMP communication or conversation between hosts, sources and computer network devices to develop or build and maintain a map of the links associated with the IP multicast transmissions for an interested receiver.

Furthermore, a host or receiver may use an IGMP report message to signal interest in receiving an audio-video channel and IGMP leave message to stop receiving an audio-video channel. However, a leave message does not typically immediately stop the audio-video channel from a source that is connected to a computer network device, such as a switch.

This is illustrated in FIG. 1, which presents an existing network. Notably, a querier switch 110 (which is connected to multiple sources 112) may not know how many receivers 116 are beyond switch 114 and/or their status (such as whether or not they are sleeping), and thus may not be able to immediately stop traffic, e.g., when it receives a leave message from a given receiver, such as receiver 116-1. Instead, in order to detect the presence of other receivers 116, querier switch 110 may use two group-specific query messages with an interval of 1 s. The query messages may trigger the interested receivers 116 to send responses or report messages. If no response is received, then querier switch 110 stops forwarding on the audio-video channel on that link. However, the resulting delay may saturate the link bandwidth between querier switch 110 and switch 112, and may adversely impact the overall quality-of-service (QoS) of the audio-video deployment.

In order to make the problem clearer, assume that a network administrator has provisioned sufficient bandwidth to carry only two audio-video channels for two receivers, such as receiver 116-1 and 116-2. Thus, receiver 116-1 and receiver 116-2 may respectively view two audio-video channels.

Subsequently, a user of receiver 116-1 may switch the audio-video channel by, e.g., pressing a button on their remote control. This audio-video channel switching may result in a leave message (to leaving the old audio-video channel) followed by a report message (to request for the new audio-video channel). In response to the leave message, querier switch 110 may follow a standard IGMP procedure of waiting more than two seconds before stopping the audio-video channel. However, the report message may trigger querier switch 110 to immediately start sending the new audio-video channel data on the link.

Consequently, for the time period of processing of the leave message, the link will be saturated with data for three audio-video channels (two old and one new audio-video channel). This extra data will cause jitter on the display screens of receiver 116-2 for 2 to 3 seconds and 2 to 3 seconds of delay for receiver 116-1 to receive the new audio-video channel. These problems will be compounded if the users of either receiver 116-1 or 116-2 is impatient and frequently switches audio-video channels.

In principle, these problems can be addressed by increasing the bandwidth of the link. However, in practice this approach is typically undesirable, because there may be multiple receivers and audio-video channels in a given network. Thus, in this approach, the network may need to overprovisioned or all of the receivers may have degraded QoS. Alternatively, in principle IGMPv3 may be implemented and used to enable host tracking. However, in practice this approach requires an expensive and complicated upgrade of the receivers.

SUMMARY

A computer network device (such as a switch or a router) that implements host tracking is described. This computer network device may include: an interface circuit; a processor; and a memory that stores program instructions, where, when executed by the processor, the program instructions cause the computer network device to perform operations. Notably, during operation, the computer network device receives a report message that is associated with a host (or receiver), which indicates the host wants to join a group in a network that receives an audio-video channel from a source. In response, the computer network device adds information associated with the host to a group data structure associated with one or more hosts in the group. Then, when the computer network device receives a leave message that is associated with the host, the computer network device removes or deactivates the host from the group data structure. Moreover, when the group data structure is empty (has no hosts) or has no active hosts, the computer network device stops forwarding the audio-video channel from the source to the group without further delay.

Note that the report message may be selectively flooded within the network (e.g., on non-edge ports). Moreover, the leave message may be selectively flooded within the network (e.g., on the non-edge ports). Thus, the computer network device may provide the report message or the leave message to one or more other computer network devices in the network via the non-edge ports. However, the flooding of the report message or the leave message may exclude forwarding to edge ports associated with the one or more hosts or the source.

Furthermore, the report message and the leave message may be compatible with an IGMP. For example, the IGMP may be IGMPv2. In some embodiments, the computer network device implements IGMPv2. Alternatively or additionally, the computer network device may not implement IGMPv3.

In some embodiments, the computer network device may dynamically determine non-edge ports within the network and edge ports associated with the one or more hosts or the source using a passive IGMP snooping neighbors protocol. Notably, the computer network device may exchange network messages (such as passive neighbor messages) with the one or more other computer network devices in the network on a type of port (such as a router port). However, the network messages may not be forwarded to the source or the one or more hosts. When the computer network device receives a given network message, the computer network device may mark one or more associated receive ports as being associated with a passive neighbor (e.g., as a passive neighbor port). The computer network device may use this information to determine a network topology, including the edge ports (to the source and the one or more hosts) and the non-edge ports (to the one or more other computer network devices). Moreover, the computer network device may use the determined edge ports to suppress or not forward the report message or the leave message to the one or more hosts or the source. Note that the network messages may be exchanged periodically, such as after a predefined time interval (such as 260 s) during which the computer network device listens for communication associated with the one or more hosts (such as a response associated with a given host in the one or more hosts).

Alternatively or additionally, the computer network device may be manually configured with information specifying the edge ports and the non-edge ports.

Moreover, the computer network device may stop the forwarding of the audio-video channel from the source without first providing a group-specific query message addressed to the one or more hosts in the group.

Another embodiment provides a computer-readable storage medium for use with the computer network device. When executed by the computer network device, this computer-readable storage medium causes the computer network device to perform at least some of the aforementioned operations.

Another embodiment provides a method, which may be performed by the computer network device. This method includes at least some of the aforementioned operations.

This Summary is provided for purposes of illustrating some exemplary embodiments, so as to provide a basic understanding of some aspects of the subject matter described herein. Accordingly, it will be appreciated that the above-described features are examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Figure 1:
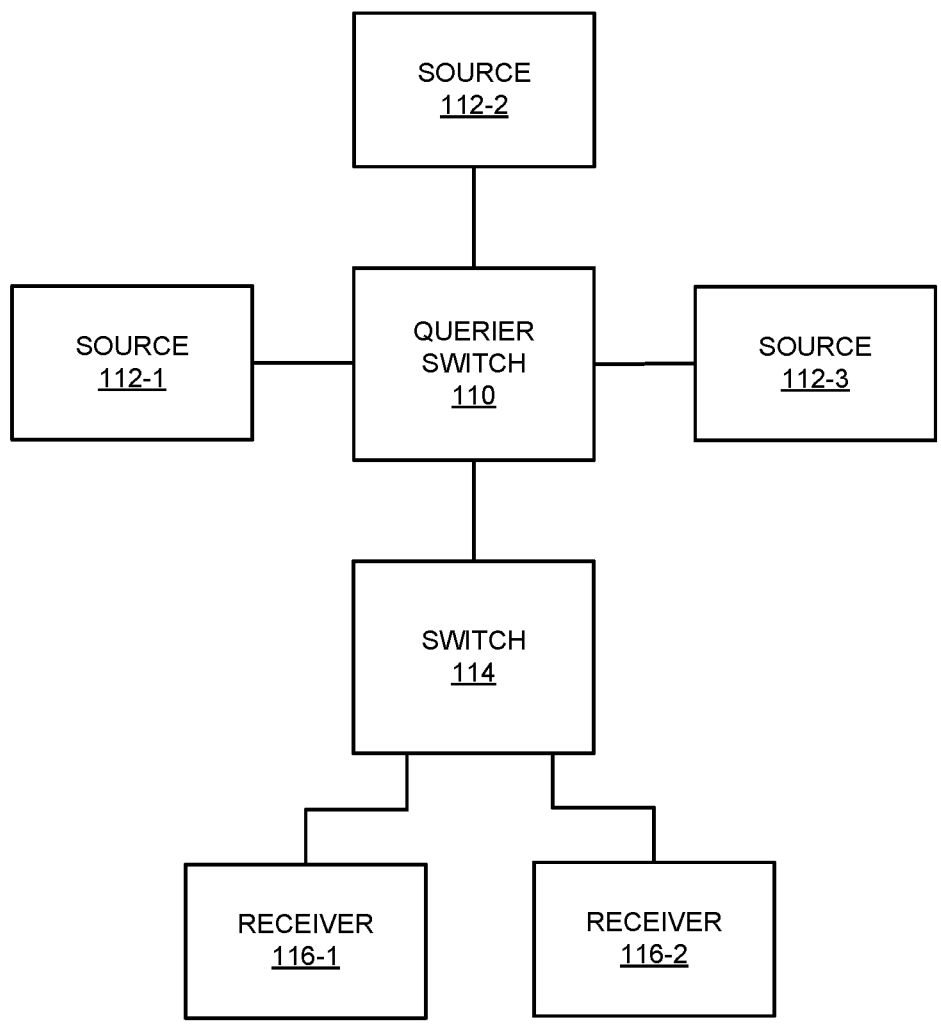
FIG. 1 is a block diagram of an existing network.

A computer network device (such as a switch or a router) that implement host tracking is described. During operation, the computer network device may receive a report message that is associated with a host, which indicates that the host wants to join a group in a network that receives an audio-video channel from a source. In response, the computer network device may add information associated with the host to a group data structure associated with one or more hosts in the group. Then, when the computer network device receives a leave message that is associated with the host, the computer network device may remove or deactivates the host from the group data structure. Moreover, when the group data structure is empty (has no hosts) or has no active hosts, the computer network device may stop forwarding the audio-video channel from the source to the group without further delay. For example, the computer network device may stop the forwarding without first providing a group-specific query message addressed to the one or more hosts in the group. Note that the report message and the leave message may be compatible with IGMPv2, and the computer network device may implement IGMPv2.

By maintaining the group data structure, these communication techniques may allow the computer network device to rapidly respond to the leave message. Notably, by avoiding the usual delay is processing of the leave message, the communication techniques may avoid link saturation, increased jitter and decreased QoS. Moreover, the communication techniques may reduce or eliminate the problems associated with the usual processing delay without requiring the use of overprovisioned links and/or the use of IGMPv3. Instead, the communication techniques may allow host tracking to be implemented using IGMPv2. Consequently, the communication techniques may improve the performance of the computer network device and/or the network that includes the computer network device.

In the discussion that follows, an access point and/or an electronic device (such as a recipient electronic device, which is sometimes referred to as a 'client') may communicate packets or frames in accordance with a wireless communication protocol, such as an Institute of Electrical and Electronics Engineers (IEEE) 802.11 standard (which is sometimes referred to as 'Wi-Fi,' from the Wi-Fi Alliance of Austin, Tex.), Bluetooth (from the Bluetooth Special Interest Group of Kirkland, Wash.), and/or another type of wireless interface. In the discussion that follows, Wi-Fi is used as an illustrative example. For example, an IEEE 802.11 standard may include one or more of: IEEE 802.11a, IEEE 802.11b, IEEE 802.11g, IEEE 802.11-2007, IEEE 802.11n, IEEE 802.11-2012, IEEE 802.11-2016, IEEE 802.11ac, IEEE 802.11ax, IEEE 802.11ba, IEEE 802.11be, or other present or future developed IEEE 802.11 technologies.

However, a wide variety of communication protocols (such as Long Term Evolution or LTE, another cellular-telephone communication protocol, etc.) may be used. The wireless communication may occur in one or more bands of frequencies, such as: a 900 MHz, a 2.4 GHz, a 5 GHz, 6 GHz, the Citizens Broadband Radio Spectrum or CBRS (e.g., a frequency band near 3.5 GHz), a band of frequencies used by LTE or another cellular-telephone communication protocol or a data communication protocol, and/or a 60 GHz frequency band. (Note that IEEE 802.11ad communication over a 60 GHz frequency band is sometimes referred to as 'WiGig.' In the present discussion, these embodiments also encompassed by 'Wi-Fi.') In some embodiments, communication between electronic devices may use multi-user transmission (such as orthogonal frequency division multiple access or OFDMA).

Moreover, the electronic device and/or the access point may communicate with one or more other access points and/or computers in a network using a wireless or a wired communication protocol, such as an IEEE 802.11 standard, an IEEE 802.3 standard (which is sometimes referred to as 'Ethernet') and/or another type of wired or wireless interface. In the discussion that follows, Ethernet is used as an illustrative example of communication between the electronic device and/or the access point and the one or more other access points and/or computers in the network.

Figure 2:
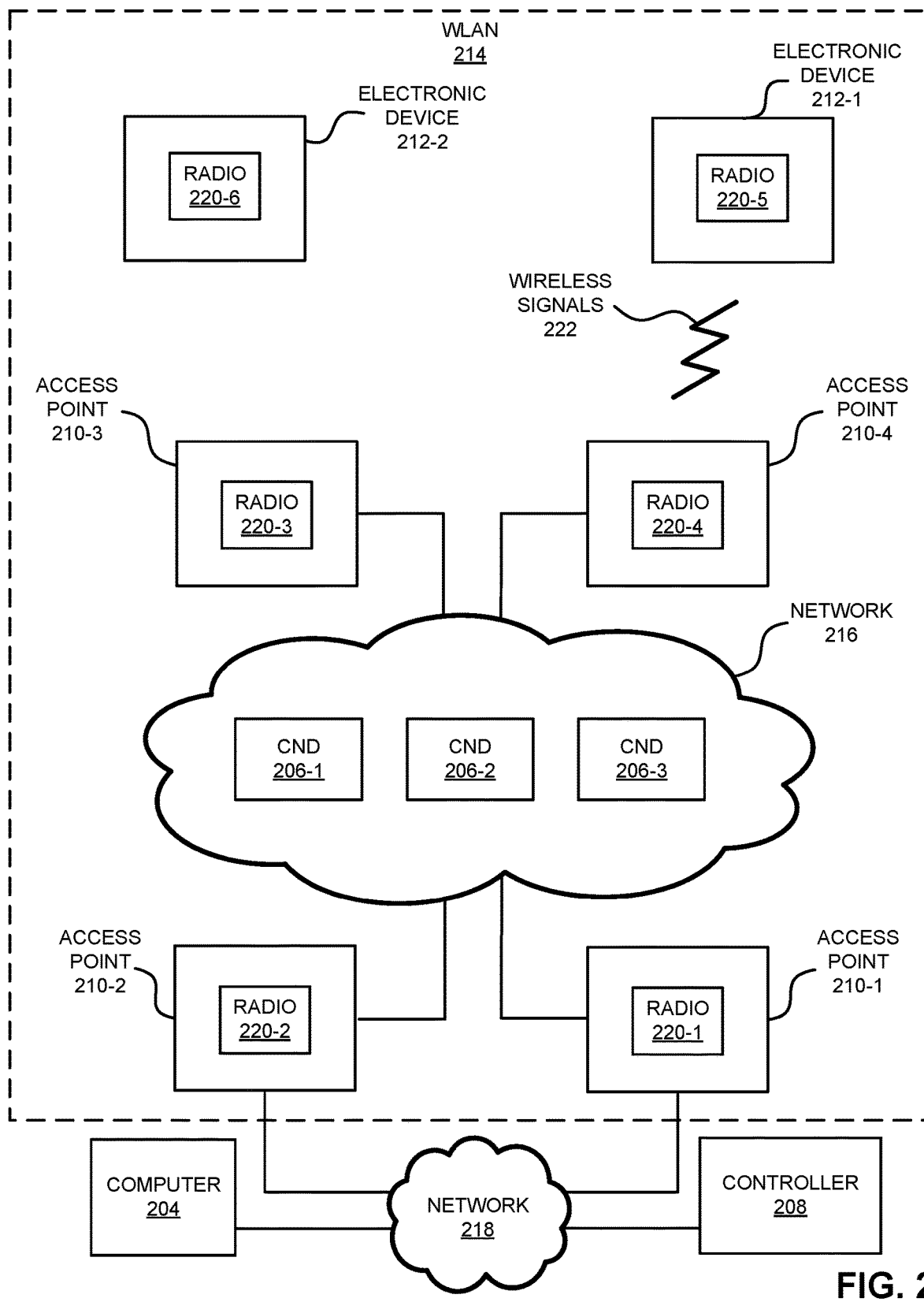
FIG. 2 is a block diagram illustrating an example of communication among access points, electronic devices and computer network devices in a network in accordance with an embodiment of the present disclosure.

FIG. 2 presents a block diagram illustrating an example of communication among one or more access points 210 and electronic devices 212 (such as a cellular telephone, and which are sometimes referred to as 'clients') in a WLAN 214 (which is used as an example of a network) in accordance with some embodiments. Access points 210 may communicate with each other in WLAN 214 using wireless and/or wired communication (such as by using Ethernet or a communication protocol that is compatible with Ethernet). Note that access points 210 may include a physical access point and/or a virtual access point that is implemented in software in an environment of an electronic device or a computer. In addition, at least some of access points 210 (such as access points 210-3 and 210-4) may communicate with electronic devices 212 using wireless communication.

The wired and/or wireless communication among access points 210 in WLAN 214 may occur via network 216 (such as an intra-net, a mesh network, point-to-point connections and/or the Internet) and may use a network communication protocol, such as Ethernet. For example, WLAN 214 may include computer network devices (CND) 206 (e.g., a switch or a router). In some embodiments, the one or more computer network device 206 may include a stack of multiple computer network devices (which are sometimes referred to as 'stacking units').

Furthermore, the wireless communication using Wi-Fi may involve: transmitting advertising frames on wireless channels, detecting one another by scanning wireless channels, establishing connections (for example, by transmitting association or attach requests), and/or transmitting and receiving packets or frames (which may include the association requests and/or additional information as payloads). In some embodiments, the wired and/or wireless communication among access points 210 also involves the use of dedicated connections, such as via a peer-to-peer (P2P) communication technique. Therefore, access points 210 may support wired communication outside of WLAN 214 (such as Ethernet) and wireless communication within WLAN 214 (such as Wi-Fi), and one or more of access points 210 may also support a wired communication protocol for communicating via network 218 with electronic devices (such as a computer 204 or a controller 208 of WLAN 214, which may be remoted located from WLAN 214).

Figure 7:
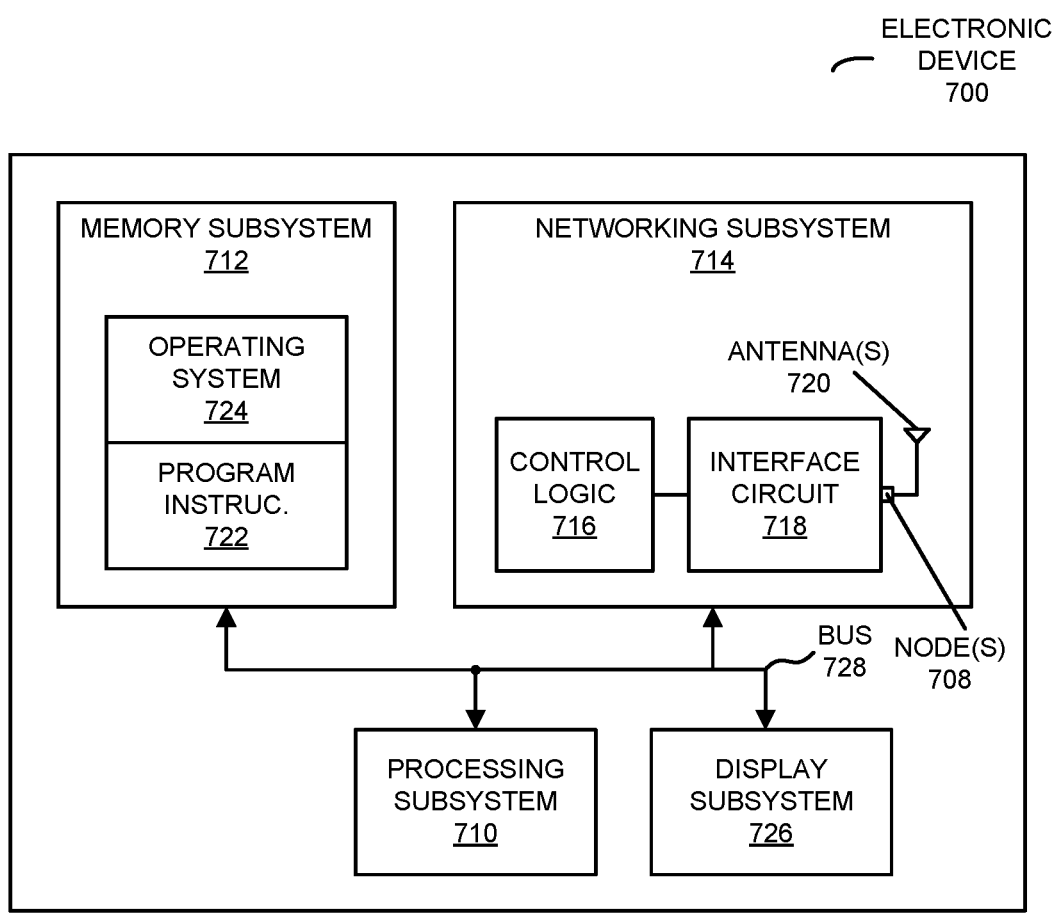
FIG. 7 is a block diagram illustrating an example of an electronic device in accordance with an embodiment of the present disclosure.

As described further below with reference to FIG. 7, the one or more computer network device 206, access points 210 and/or electronic devices 212 may include subsystems, such as a networking subsystem, a memory subsystem and a processor subsystem. In addition, access points 210 and electronic devices 212 may include radios 220 in the networking subsystems. More generally, access points 210 and electronic devices 212 can include (or can be included within) any electronic devices with the networking subsystems that enable access points 210 and electronic devices 212 to communicate with each other using wireless and/or wired communication. This wireless communication can comprise transmitting advertisements on wireless channels to enable access points 210 and/or electronic devices 212 to make initial contact or detect each other, followed by exchanging subsequent data/management frames (such as association requests and responses) to establish a connection, configure security options (e.g., Internet Protocol Security), transmit and receive packets or frames via the connection, etc. Note that while instances of radios 220 are shown in access points 210 and electronic devices 212, one or more of these instances may be different from the other instances of radios 220.

As can be seen in FIG. 2, wireless signals 222 (represented by a jagged line) are transmitted from radio 220-4 in access point 210-4. These wireless signals may be received by radio 220-5 in electronic device 212-1. Notably, access point 210-4 may transmit packets or frames. In turn, these packets or frames may be received by electronic device 212-1. Moreover, access point 210-4 may allow electronic device 212-1 to communicate with other electronic devices, computers and/or servers via networks 216 and/or 218.

Note that the communication among access points 210 and/or with electronic devices 212 (and, more generally, communication among components in WLAN 214) may be characterized by a variety of performance metrics, such as: a received signal strength (RSSI), a data rate, a data rate for successful communication (which is sometimes referred to as a 'throughput'), an error rate (such as a retry or resend rate), a mean-square error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization').

In the described embodiments processing a packet or frame in access points 210 and electronic devices 212 includes: receiving signals (such as wireless signals 222) corresponding to the packet or frame; decoding/extracting the packet or frame from received wireless signals 222 to acquire the packet or frame; and processing the packet or frame to determine information contained in the packet or frame.

Although we describe the network environment shown in FIG. 2 as an example, in alternative embodiments, different numbers or types of electronic devices may be present. For example, some embodiments comprise more or fewer electronic devices. As another example, in another embodiment, different electronic devices are transmitting and/or receiving packets or frames.

As noted previously, the absence of host tracking (e.g., in existing implementations of IGMPv2) often result in delays, jitter and reduced QoS of audio-video channels in IP networks. Moreover, it is often difficult to segregate edge ports and non-edge ports using existing IGMP snooping techniques. Consequently, many existing computer network devices are unable to support advanced features, which can degrade performance of the computer network devices and/or networks that include the computer network devices.

As described further below with reference to FIGS. 3-6, in order to address these problems, computer network devices 206 may implement host tracking and/or a passive snooping neighbors protocol. In the discussion that follows, IGMP snooping is used as an illustrative example. However, in other embodiments, another communication protocol may be used to facilitate passive neighbors discovery.

Notably, the communication techniques may allow a computer network device (such as computer network device 206-1) that implements IGMP snooping to segregate edge ports (such as ports connected to a host or a source in a network) from non-edge ports (such as ports connected to other computer network devices 206 in the network) and, more generally, to compute or determine a topology of the network. Moreover, the communication techniques may allow computer network device 206-1 to identify one or more ports (such as router ports) associated with other computer network devices (such as computer network device 206-2) in the network that implement IGMP snooping. These capabilities of computer network device 206-1 may be facilitated by monitoring communication in the network (such as IGMP messages, e.g., IGMP report or leave messages, IGMP group addressed messages, IGMP queries, etc.) and periodically exchanging messages (such as passive monitoring messages) in the network with, e.g., computer network device 206-2 in the network, via as associated port. Note that an IGMP group addressed message may include: a source Internet Protocol address, an IGMP type, a group address, and/or other information.

Using the communication techniques, computer network device 206-1 may identify non-edge electronic devices in the network (such as computer network device 206-2). Notably, computer network device 206-1 may declare or notify computer network device 206-2 that it is a passive IGMP snooping neighbor (PIGSN), i.e., that it implements the passive IGMP snooping protocol, by periodically providing passive network messages on a port associated with a link with computer network device 206-2. Similarly, computer network device 206-2 may declare or notify computer network device 206-1 that it is a PIGSN by periodically providing passive network messages on a port associated with a link with computer network device 206-1. Note that the periodically exchanged passive network messages may be provided after a time interval (such as, e.g., 260 s).

When a given computer network device (such as computer network device 206-2) receives a passive neighbor message on a port, it may note or mark that this port is associated with a PIGSN (and that it is a non-edge port). Moreover, computer network device 206-2 may not forward the passive neighbor message to other computer network devices 206 in the network.

Similarly, after a time interval (such as. e.g., 260 s) has elapsed, computer network device 206-2 may send a second passive neighbor message to computer network device 206-1 via the same or another port. When computer network device 206-1 receives this second passive neighbor message on a second port, it may note or mark that the second port is associated with a PIGSN (and that it is a non-edge port). Once again, computer network device 206-1 may not forward the second passive neighbor message to other computer network devices 206 in the network. Thus, the passive neighbor messages may not be propagated across the network.

Moreover, when computer network device 206-1 receives another type of message (such as an IGMP report or leave message, which may be an IGMP group addressed message) via another port from a host (such as one of electronic devices 212) in the network, computer network device 206-1 may provide the other type of message to the other computer network devices 206 via PIGSN ports. However, computer network device 206-1 may suppress forwarding of the other type of message to the host. Thus, the computer network device may selectively provide or forward the other type of message based at least in part on identified PIGSN ports or the non-edge ports in the network. In some embodiments, the other type of message is received by computer network device 206-1 from a querier in the network (e.g., computer network device 206-3), which may be a central point in a multicast group in the network that is coupled or connected to the host.

Alternatively or additionally, computer network devices 206 may implement host tracking. In some embodiments, the host tracking is enabled or facilitated by the passive snooping neighbors protocol.

Notably, a given one of computer network devices 206 (such as computer network device 206-1) may receive a report message (such as an IGMP report message, e.g., an IGMPv2 report message) from a host or receiver (such as electronic device 212-1), which indicates that the host wants to join a group in a network that receives an audio-video channel from a source (such as computer 204). In response, computer network device 206-1 may add information associated with the host to a group data structure associated with one or more hosts in the group. For example, the information may include a network path or link associated with the host, a port associated with the network path or link, and/or an identifier of the host (such as an IP address of the host).

Then, when computer network device 206-1 receives a leave message (such as an IGMP leave message, e.g., an IGMPv2 leave message) from the host, computer network device 206-1 may remove or deactivate the host from the group data structure. Moreover, when the group data structure is empty (has no hosts) or has no active hosts, computer network device 206-1 may stop forwarding the audio-video channel from the source to the group without further delay. For example, computer network device 206-1 may stop the forwarding of the audio-video channel from the source without first providing a group-specific query message addressed to the one or more hosts in the group.

Note that the report message may be selectively flooded within the network (e.g., on non-edge ports). Moreover, the leave message may be selectively flooded within the network (e.g., on the non-edge ports). Thus, computer network device 206-1 may provide the report message or the leave message to one or more other computer network devices 206 in the network via the non-edge ports. However, the flooding of the report message or the leave message may exclude forwarding to edge ports associated with the one or more hosts or the source. The selective forwarding may be based at least in part on the network information or network topology (such as the edge and the non-edge ports in the network) that is learned by computer network device 206-1 using the passive snooping neighbors protocol. Alternatively or additionally, computer network device 206-1 may be manually configured (e.g., by a network administrator) with information specifying the edge ports and the non-edge ports.

In some embodiments, computer network device 206-1 implements IGMPv2. Alternatively or additionally, computer network device 206-1 may not implement or may not be compatible with IGMPv3.

In these ways, computer network devices 206 may identify PIGSNs in the network (and, thus, the edge ports and non-edge ports in the network). More generally, computer network devices 206 may compute or determine a topology of the network based at least in part on the exchanged passive neighbor messages and the associated ports. Furthermore, computer network devices 206 may implement host tracking without requiring an upgrade to IGMPv3. These capabilities may allow computer network devices 206 to reduce or eliminate the bandwidth-saturation problem, and thus to provide improved performance and QoS (such as avoiding delays and jitter), and to support advanced features. Therefore, the communication techniques may improve the user experience when using computer network devices 206 and/or the network that includes computer network devices 206.

Figure 3:
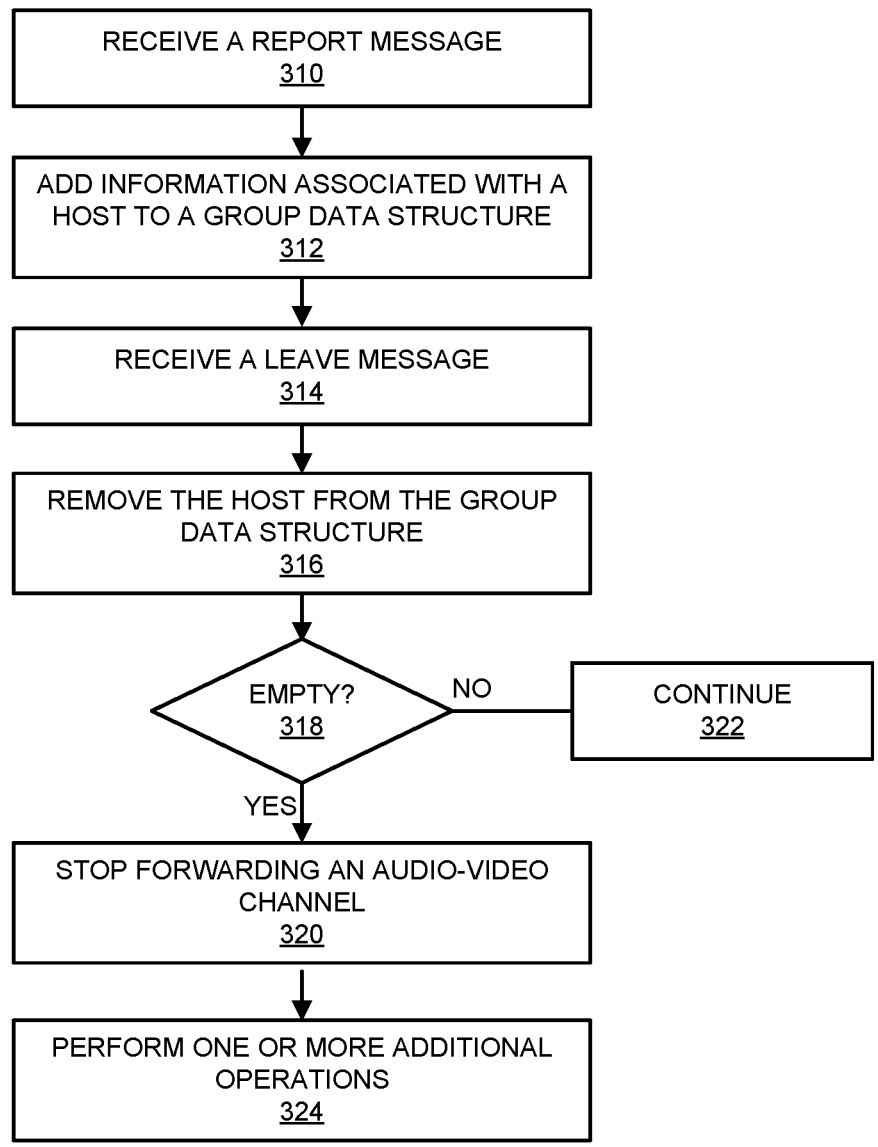
FIG. 3 is a flow diagram illustrating an example of a method for performing host tracking using a computer network device in FIG. 1 in accordance with an embodiment of the present disclosure.

We now describe embodiments of a method. FIG. 3 presents a flow diagram illustrating an example of a method 300 for performing host tracking in accordance with some embodiments. This method may be performed by a computer network device (such as one of computer network devices 206 in FIG. 2).

During operation, the computer network device (such as a router or a switch) may receive a report message (operation 310) that is associated with a host (or receiver), which indicates that the host wants to join a group in a network that receives an audio-video channel from a source.

In response, the computer network device may add information associated with the host to a group data structure (operation 312) associated with one or more hosts in the group.

Then, when the computer network device receives a leave message (operation 314) that is associated with the host, the computer network device may remove (operation 316) or deactivates the host from the group data structure.

Moreover, when the group data structure is empty (operation 318) or has no active hosts, the computer network device may stop forwarding the audio-video channel (operation 320) from the source to the group without further delay. For example, the computer network device may stop the forwarding of the audio-video channel from the source without first providing a group-specific query message addressed to the one or more hosts in the group. Otherwise, the computer network device may continue (operation 322) to forward the audio-video channel.

In some embodiments, the computer network device may optionally perform one or more additional operations (operation 324). For example, the computer network device may selectively forward or flood the report message and/or the leave message within the network (e.g., on non-edge ports). Thus, the computer network device may provide the report message or the leave message to one or more other computer network devices in the network via the non-edge ports. However, the flooding of the report message or the leave message may exclude forwarding to edge ports associated with the one or more hosts or the source.

Furthermore, the report message and the leave message may be compatible with an IGMP. For example, the IGMP may be IGMPv2. In some embodiments, the computer network device implements IGMPv2. Alternatively or additionally, the computer network device may not implement IGMPv3.

In some embodiments, the computer network device may dynamically determine non-edge ports within the network and edge ports associated with the one or more hosts or the source using a passive IGMP snooping neighbors protocol. Notably, the computer network device may exchange network messages (such as passive neighbor messages) with the one or more other computer network devices in the network on a type of port (such as a router port). However, the network messages may not be forwarded to the source or the one or more hosts. When the computer network device receives a given network message, the computer network device may mark one or more associated receive ports as being associated with a passive neighbor (e.g., as a passive neighbor port). The computer network device may use this information to determine a network topology, including the edge ports (to the source and the one or more hosts) and the non-edge ports (to the one or more other computer network devices). Moreover, the computer network device may use the determined edge ports to suppress or not forward the report message or the leave message to the one or more hosts or the source. Note that the network messages may be exchanged periodically, such as after a predefined time interval (such as 260 s) during which the computer network device listens for communication associated with the one or more hosts (such as a response associated with a given host in the one or more hosts).

Alternatively or additionally, the computer network device may be manually configured with information specifying the edge ports and the non-edge ports.

Note that the dynamic determining of the edge ports and/or the non-edge ports may be useful for the host tracking. Notably, because IGMPv2 supports report suppression, if a given report message is forwarded on edge ports where the one or more hosts are connected, a corresponding host will suppress its own report message. This will result in report misses in the network and traffic disturbances. The passive IGMP snooping neighbors protocol allows internal links (and, thus, non-edge ports) to be identified and segregated from host links (and, thus, edge ports). Because of the IGMPv2 host tracking, the computer network device knows exactly how many receivers a group has on a link. Therefore, the computer network devices does not need to depend on an IGMP group-specific message (such as a query message) to detect the other receivers. Consequently, the use of IGMP group-specific query messages can be eliminated from the network.

In some embodiments of method 300, there may be additional or fewer operations. Furthermore, the order of the operations may be changed, and/or two or more operations may be combined into a single operation.

Figure 4:
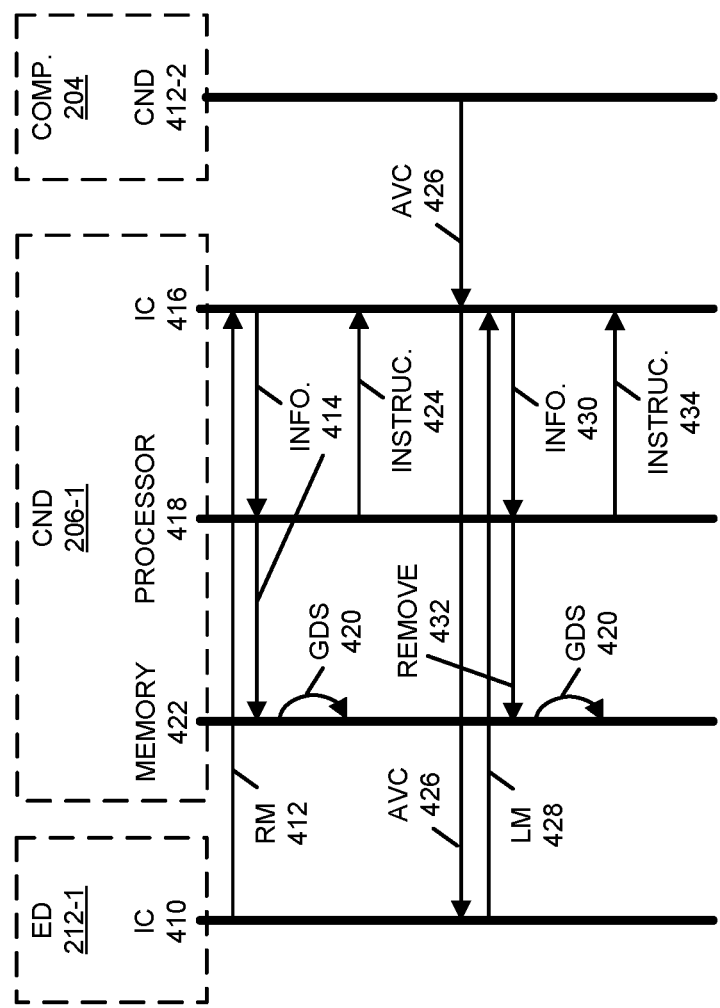
FIG. 4 is a drawing illustrating an example of communication among components in an electronic device in FIG. 1 in accordance with an embodiment of the present disclosure.

FIG. 4 presents a drawing illustrating an example of communication among electronic device 212-1 (or a host), computer network devices 206 and computer 204 (or a source) in a network in accordance with some embodiments. Notably, an interface circuit (IC) 410 in electronic device (ED) 212-1 may send a report message (RM) 412 to computer network device 206-1, which includes information 414 indicates that electronic device 212-1 wants to join a group in a network that receives an audio-video channel from computer 204.

After receiving report message 412, an interface circuit 416 in computer network device 206-1 may provide information 414 to a processor 418 in computer network device 206-1. Processor 418 may add information 414 associated with electronic device 212-1 to a group data structure (GDS) 420 associated with one or more hosts in the group, which is stored in memory 422 in computer network device 206-1. Moreover, processor 418 may instruct 424 interface circuit 416 to forward an audio-video channel (AVC) 426 from computer 204 to electronic device 112-1.

Subsequently, interface circuit 410 may send a leave message (LM) 428 to computer network device 206-1. After receiving leave message 428, interface circuit 416 may provide information 430 corresponding to leave message 428 to processor 418. Based at least in part on information 430, processor 418 may remove 432 or deactivate electronic device 212-1 from group data structure 420 in memory 422. Moreover, when group data structure 420 is empty (has no hosts) or has no active hosts, processor 418 may instruct 434 interface circuit 416 to stop forwarding audio-video channel 426 from computer 204 to electronic device 112-1 without further delay (as opposed to first providing a group-specific query message addressed to the one or more hosts in the group). Thus, computer network device 106-1 may immediately stop forwarding audio-video channel 426 from computer 204 to electronic device 112-1.

While FIG. 4 illustrates communication between components using unidirectional or bidirectional communication with lines having single arrows or double arrows, in general the communication in a given operation in these figures may involve unidirectional or bidirectional communication.

Figure 5:
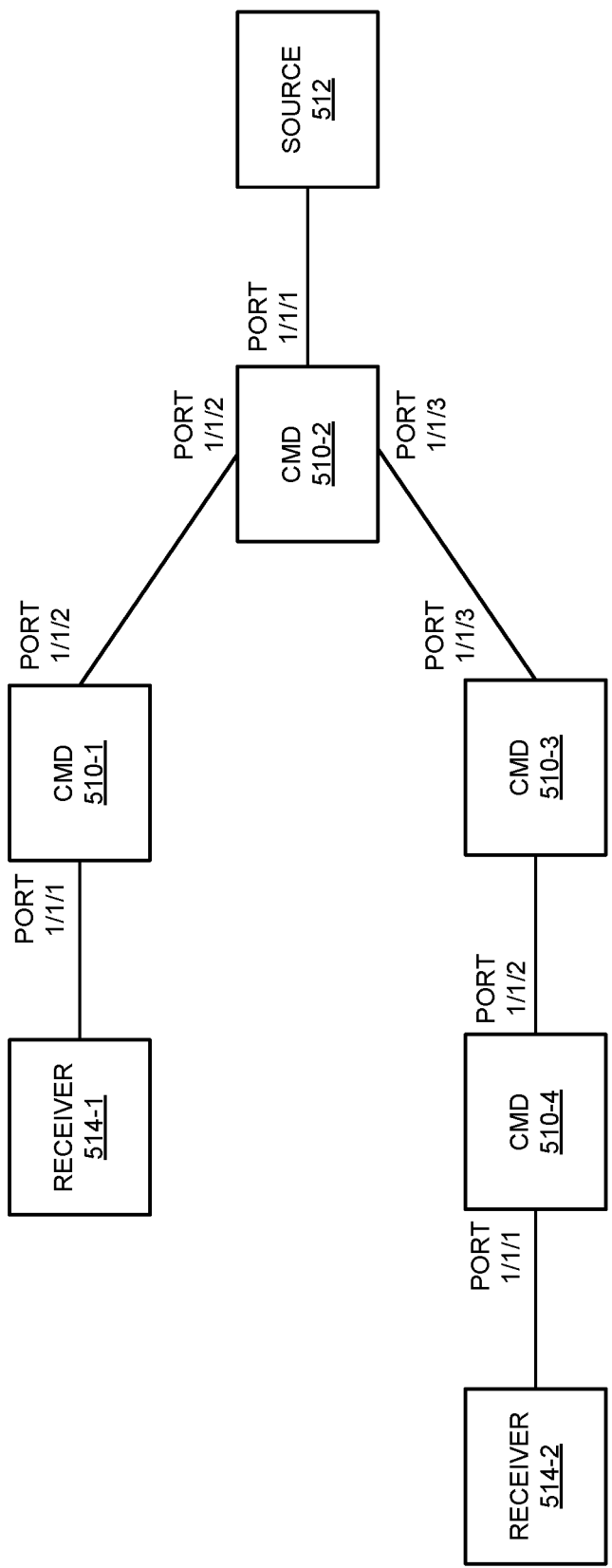
FIG. 5 is a block diagram illustrating an example of a passive IGMP snooping neighbors protocol in a network in accordance with an embodiment of the present disclosure.

FIG. 5 presents a block diagram illustrating an example of a passive IGMP snooping neighbors protocol in a network in accordance with some embodiments. The network illustrated in FIG. 5 includes computer network devices 510, a source 512, and receivers (or hosts) 514 in one or more multicast groups.

Computer network devices 510 may obtain information about the network via IGMP queries and responses or reports. For example, computer network device 510-2, which is coupled or connected to source 512, may provide IGMP queries to computer network devices 510-1 and 510-3. (However, computer network device 510-2 may not provide IGMP queries to source 512. Instead, computer network device 510-2 may be a querier in the network. In response to IGMP queries, computer network devices 510-1 and 510-3 may provide IGMP reports. Receivers 514 may provide IGMP report or leave messages.) Then, computer network device 510-1 forwards an IGMP report to receiver 514-1. Moreover, computer network device 510-3 forwards an IGMP report to computer network device 514-4, which forwards an IGMP report to receiver 514-2. Note that one or more of receivers 514 may suppress reports, i.e., they may not respond to IGMP queries or reports. This may prevent computer network devices 510 from determining membership in the one or more multicast groups.

In the passive IGMP snooping neighbors protocol, PIGSNs are non-querier computer network devices 510-1, 510-3 and 510-4. These computer network devices may perform the following operations. When computer network devices 510-1, 510-3 and 510-4 detect that they are PIGSNs, they start sending passive neighbor messages to each other on router ports. The passive neighbor messages do not propagate across the network, e.g., to source 512 or receivers 514. The computer network devices 510-1, 510-3 and 510-4 that receive an instance of a passive neighbor message may mark the receive port(s) as being associated with a passive neighbor.

Using the passive IGMP snooping neighbors protocol, each of computer network devices 510-1, 510-3 and 510-4 may build knowledge of the presence of a querier (such as computer network device 510-2), passive neighbors on each of its ports and, thus, the topology of the network. Thus, computer network devices 510-1, 510-3 and 510-4 may compute which ports are edge-ports and which are non-edge ports. For example, information about the network topology shown in FIG. 5 is summarized in Table 1. This information may allow computer network devices 510-1, 510-3 and 510-4 to suppress forwarding of an IGMP report or leave message on a port to source 512 or receivers 514-2. Instead, computer network devices 510-1, 510-3 and 510-4 may selectively forward or flood the IGMP query or IGMP report or leave messages within the network. Moreover, using the computed information, a given computer network device in the network may dynamically enable support for advance features. In some embodiments, an advanced feature may include SDVoE flooding reports on or restricted to non-edge ports in the network. This may avoid manual configuration or intervention and may help a network administrator to more easily deploy SDVoE.

TABLE 1

| Computer Network Device | Router-Ports | Passive-Neighbor Ports | Remarks |
|---|---|---|---|
| 510-1 (Passive Neighbor) | 1/1/2 | None | Doesn't has a passive-neighbor computer network device connected. |
| 510-2 (Querier) | None | 1/1/2, 1/1/3 | Querier only has passive neighbors |
| 510-3 (Passive Neighbor) | 1/1/3 | 1/1/2 | It has both passive neighbor and router ports. |
| 510-4 (Passive Neighbor) | 1/1/2 | None | |

In an existing IGMP communication protocol, a querier switch (or router) may periodically send IGMP query messages. Other switches receiving such an IGMP query message may marks the associated ports/link as a router port and may mark themselves as passive switch. Then, the other switches may forward the IGMP query message to other ports.

In the passive IGMP snooping neighbors protocol, a switch (or a router) implementing the protocol may sends IGMP passive neighbor messages periodically on one or more router ports. Another switch receiving one of the IGMP passive neighbor messages may mark the associated ports/links as being passive neighbor port(s). This switch may not forward this IGMP passive neighbor message to other ports. Moreover, other passive switches in a network may repeat these operations to implement passive neighbors protocol.

By performing the passive IGMP snooping neighbors protocol, the switches (and/or routers) in the network may learn or identify: non-edge-ports (ports marked as a router port and a passive neighbor port); and edge-ports (ports not marked as a router port and a passive neighbor port). Using this knowledge, IGMP report or leave messages sent by a receiver or a host can be efficiently flooded and restricted only on the non-edge-ports. This capability may help implementation of enhanced features, such as SDVoE, IGMP v2 true fast leave, etc., without manual intervention.

Note that some embodiments of the communication techniques may be used in conjunction with other features or aspects of Internet Protocol v6 (IPV6), such as multicast listener discovery snooping.

Figure 6:
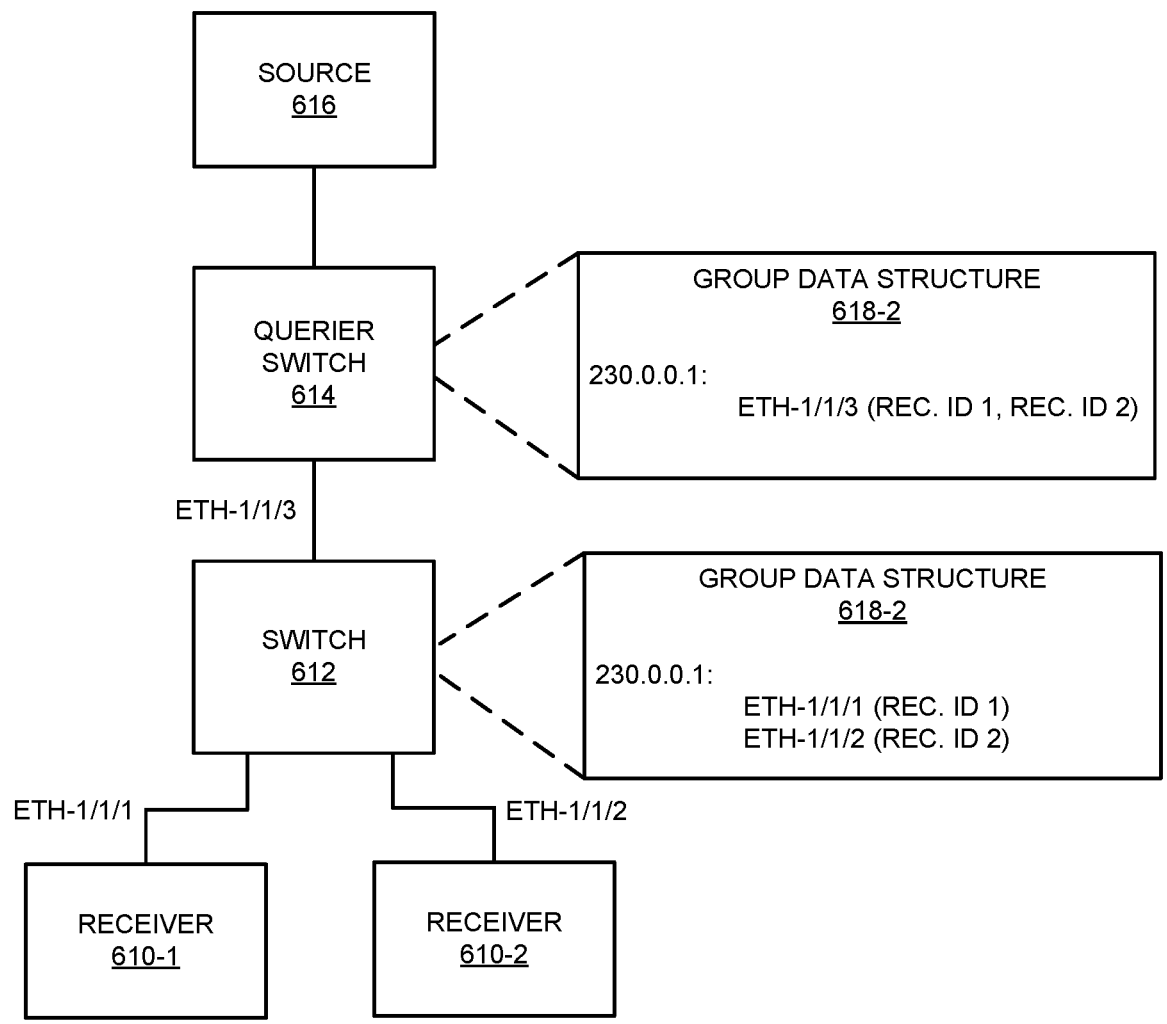
FIG. 6 is a block diagram illustrating an example of host tracking in a network using IGMPv2 in accordance with an embodiment of the present disclosure.

FIG. 6 presents a block diagram illustrating an example of host tracking in a network using IGMPv2. In order to support IGMPv2 host tracking following procedure may be implemented. Notably, an IGMP report message from receiver 610-1 may be flooded in the network. This IGMP report message may indicate that receiver 610-1 wants to join a group of one or more hosts that receives an audio-video channel (and, more generally, content or data) from source 616. Each of switches 612 and 614 may receive the report message and may build its group data structure with host information about receiver 610-1. For example, group data structure 618-1 in switch 612 may specify the ports associated with receivers 610 and identifiers of receivers 610, and group data structure 618-2 in switch 614 may specify the ports to switch 612, which is associated with receivers 610, as well as the identifiers of receivers 610.

Subsequently, when an IGMP leave message from receiver 610-1 is flooded in the network, each of switches 612 and 614 may receive the leave message and may remove the corresponding host (receiver 610-1) from group data structures 618. If a group data structure (such as data structure 618-1) becomes empty, the corresponding switch (such as switch 614) may immediately stop forwarding the audio-video channel (i.e., without further delay, such as the delay associated with an IGMP query message to receivers 610).

Note that because IGMPv2 supports report suppression, report messages should not be forwarded on edge ports in the network where receivers 610 are connected. Otherwise, receivers 610 will suppress their own report messages, which may result in report misses in the network and, thus, traffic disturbance. For example, if receiver 610-1 sends a report message that is forwarded by receiver 610-2, then receiver 610-2 will suppress its interest in joining the group.

In order to dynamically determine internal links and segregate the host links connected to a given switch (such as switch 612), IGMPv2 host tracking may leverage the network information determined using PIGSN and/or may be provisioned manually via user configuration. Because IGMPv2 host tracking enables switches 612 and 614 to know exactly how many receivers 610 there are in a group on a link, switches 612 and 614 do not need to depend on IGMP group-specific query messages to detect other receivers 610. Consequently, the disclosed communication techniques may eliminate the use of group-specific query messages from the network, and may reduce or eliminate the bandwidth-saturation problem.

We now describe embodiments of an electronic device, which may perform at least some of the operations in the communication techniques. FIG. 7 presents a block diagram illustrating an example of an electronic device 700 in accordance with some embodiments, such as one of computer 204, one of computer network devices 206, controller 208, one of access points 210 or one of electronic devices 212. This electronic device includes processing subsystem 710, memory subsystem 712, and networking subsystem 714. Processing subsystem 710 includes one or more devices configured to perform computational operations. For example, processing subsystem 710 can include one or more microprocessors, ASICs, microcontrollers, programmable-logic devices, one or more graphics process units (GPUs) and/or one or more digital signal processors (DSPs).

Memory subsystem 712 includes one or more devices for storing data and/or instructions for processing subsystem 710 and networking subsystem 714. For example, memory subsystem 712 can include dynamic random access memory (DRAM), static random access memory (SRAM), and/or other types of memory. In some embodiments, instructions for processing subsystem 710 in memory subsystem 712 include: one or more program modules or sets of instructions (such as program instructions 722 or operating system 724), which may be executed by processing subsystem 710. Note that the one or more computer programs may constitute a computer-program mechanism. Moreover, instructions in the various modules in memory subsystem 712 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 710.

In addition, memory subsystem 712 can include mechanisms for controlling access to the memory. In some embodiments, memory subsystem 712 includes a memory hierarchy that comprises one or more caches coupled to a memory in electronic device 700. In some of these embodiments, one or more of the caches is located in processing subsystem 710.

In some embodiments, memory subsystem 712 is coupled to one or more high-capacity mass-storage devices (not shown). For example, memory subsystem 712 can be coupled to a magnetic or optical drive, a solid-state drive, or another type of mass-storage device. In these embodiments, memory subsystem 712 can be used by electronic device 700 as fast-access storage for often-used data, while the mass-storage device is used to store less frequently used data.

Networking subsystem 714 includes one or more devices configured to couple to and communicate on a wired and/or wireless network (i.e., to perform network operations), including: control logic 716, an interface circuit 718 and one or more antennas 720 (or antenna elements). (While FIG. 7 includes one or more antennas 720, in some embodiments electronic device 700 includes one or more nodes, such as nodes 708, e.g., a network node that can be coupled or connected to a network or link, or an antenna node, connector or a metal pad that can be coupled to the one or more antennas 720. Thus, electronic device 700 may or may not include the one or more antennas 720.) For example, networking subsystem 714 can include a Bluetooth™ networking system, a cellular networking system (e.g., a 3G/4G/5G network such as UMTS, LTE, etc.), a universal serial bus (USB) networking system, a networking system based on the standards described in IEEE 802.11 (e.g., a Wi-Fi® networking system), an Ethernet networking system, a cable modem networking system, and/or another networking system.

Note that a transmit or receive antenna pattern (or antenna radiation pattern) of electronic device 700 may be adapted or changed using pattern shapers (such as reflectors) in one or more antennas 720 (or antenna elements), which can be independently and selectively electrically coupled to ground to steer the transmit antenna pattern in different directions. Thus, if one or more antennas 720 include N antenna pattern shapers, the one or more antennas may have $2^N$ different antenna pattern configurations. More generally, a given antenna pattern may include amplitudes and/or phases of signals that specify a direction of the main or primary lobe of the given antenna pattern, as well as so-called 'exclusion regions' or 'exclusion zones' (which are sometimes referred to as 'notches' or 'nulls'). Note that an exclusion zone of the given antenna pattern includes a low-intensity region of the given antenna pattern. While the intensity is not necessarily zero in the exclusion zone, it may be below a threshold, such as 3 dB or lower than the peak gain of the given antenna pattern. Thus, the given antenna pattern may include a local maximum (e.g., a primary beam) that directs gain in the direction of electronic device 700 that is of interest, and one or more local minima that reduce gain in the direction of other electronic devices that are not of interest. In this way, the given antenna pattern may be selected so that communication that is undesirable (such as with the other electronic devices) is avoided to reduce or eliminate adverse effects, such as interference or crosstalk.

Networking subsystem 714 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 700 may use the mechanisms in networking subsystem 714 for performing simple wireless communication between the electronic devices, e.g., transmitting advertising or beacon frames and/or scanning for advertising frames transmitted by other electronic devices as described previously.

Within electronic device 700, processing subsystem 710, memory subsystem 712, and networking subsystem 714 are coupled together using bus 728. Bus 728 may include an electrical, optical, and/or electro-optical connection that the subsystems can use to communicate commands and data among one another. Although only one bus 728 is shown for clarity, different embodiments can include a different number or configuration of electrical, optical, and/or electro-optical connections among the subsystems.

In some embodiments, electronic device 700 includes a display subsystem 726 for displaying information on a display, which may include a display driver and the display, such as a liquid-crystal display, a multi-touch touchscreen, etc.

Electronic device 700 can be (or can be included in) any electronic device with at least one network interface. For example, electronic device 700 can be (or can be included in): a desktop computer, a laptop computer, a subnotebook/netbook, a server, a tablet computer, a smartphone, a cellular telephone, a smartwatch, a consumer-electronic device, a portable computing device, an access point, a transceiver, a router, a switch, communication equipment, a computer network device, a stack of multiple computer network devices, a controller, test equipment, an Internet-of-Things (IoT) device, and/or another electronic device.

Although specific components are used to describe electronic device 700, in alternative embodiments, different components and/or subsystems may be present in electronic device 700. For example, electronic device 700 may include one or more additional processing subsystems, memory subsystems, networking subsystems, and/or display subsystems. Additionally, one or more of the subsystems may not be present in electronic device 700. Moreover, in some embodiments, electronic device 700 may include one or more additional subsystems that are not shown in FIG. 7. Also, although separate subsystems are shown in FIG. 7, in some embodiments some or all of a given subsystem or component can be integrated into one or more of the other subsystems or component(s) in electronic device 700. For example, in some embodiments program instructions 722 are included in operating system 724 and/or control logic 716 is included in interface circuit 718. In some embodiments, the communication techniques are implemented using information in L1, L1.5 and/or L2 of an Open Systems Interconnection (OSI) model.

Moreover, the circuits and components in electronic device 700 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of electronic device 700 and/or networking subsystem 714. The integrated circuit may include hardware and/or software mechanisms that are used for transmitting wireless signals from electronic device 700 and receiving signals at electronic device 700 from other electronic devices. Aside from the mechanisms herein described, radios are generally known in the art and hence are not described in detail. In general, networking subsystem 714 and/or the integrated circuit can include any number of radios. Note that the radios in multiple-radio embodiments function in a similar way to the described single-radio embodiments.

In some embodiments, networking subsystem 714 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII), Electronic Design Interchange Format (EDIF), OpenAccess (OA), or Open Artwork System Interchange Standard (OASIS). Those of skill in the art of integrated circuit design can develop such data structures from schematics of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used Ethernet and a Wi-Fi communication protocol as an illustrative example, in other embodiments a wide variety of communication protocols and, more generally, wired and/or wireless communication techniques may be used. Thus, the communication techniques may be used with a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication techniques may be implemented using program instructions 722, operating system 724 (such as a driver for interface circuit 718) or in firmware in interface circuit 718. Alternatively or additionally, at least some of the operations in the communication techniques may be implemented in a physical layer, such as hardware in interface circuit 718.

In the preceding description, we refer to 'some embodiments.' Note that 'some embodiments' describes a subset of all of the possible embodiments, but does not always specify the same subset of embodiments. Moreover, note that numerical values in the preceding embodiments are illustrative examples of some embodiments. In other embodiments of the communication techniques, different numerical values may be used.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A computer network device, comprising:
   an interface circuit;
   a processor; and
   memory configured to store program instructions, wherein, when executed by the processor, the program instructions cause the computer network device to perform operations comprising:
   receiving a report message that is associated with a host, which indicates that the host wants to join a group in a network that receives an audio-video channel from a source;
   adding, based at least in part on the report message, information associated with the host to a group data structure that comprises information associated with one or more hosts in the group;
   when the computer network device receives a leave message that is associated with the host, removing or deactivating the host from the group data structure;
   selectively flooding the report message or the leave message within the network on non-edge ports in the network, wherein the report message or the leave message is not forwarded to edge ports in the network associated with the one or more hosts or the source; and
   when the group data structure is empty or has no active hosts, stopping forwarding of the audio-video channel from the source to the group without further delay.

2. The computer network device of claim 1, wherein the computer network device comprises a switch or a router.

3. The computer network device of claim 1, wherein the operations comprise providing the report message or the leave message to one or more other computer network devices in the network via the non-edge ports.

4. The computer network device of claim 1, wherein the report message and the leave message are compatible with an Internet group management protocol (IGMP).

5. The computer network device of claim 4, wherein the IGMP comprises IGMP version 2 (IGMPv2).

6. The computer network device of claim 1, wherein the computer network device implements IGMPv2.

7. The computer network device of claim 1, wherein the computer network device does not implement IGMP version 3 (IGMPv3).

8. The computer network device of claim 1, wherein the operations comprise dynamically determining the non-edge ports in the network and the edge ports in the network associated with the one or more hosts or the source.

9. The computer network device of claim 8, wherein the operations comprise:
   exchanging network messages with one or more other computer network devices in the network on a type of port;
   when the computer network device receives a given network message, marking one or more associated receive ports as being associated with a passive neighbor; and
   determining a network topology comprising the edge ports associated with the source and the one or more hosts and the non-edge ports associated with the one or more other computer network devices.

10. The computer network device of claim 9, wherein the type of port comprises a router port.

11. The computer network device of claim 9, wherein the network messages are not forwarded to the source or the one or more hosts.

12. The computer network device of claim 9, wherein the operations comprise providing the report message or the leave message to one or more other computer network devices in the network based at least in part on the determined network topology, and the report message or the leave message is not forwarded to the one or more hosts or the source based at least in part on the determined network topology.

13. The computer network device of claim 1, wherein the computer network device stops the forwarding of the audio-video channel from the source without first providing a group-specific query message addressed to the one or more hosts in the group.

14. A non-transitory computer-readable storage medium for use in conjunction with a computer network device, the computer-readable storage medium storing program instructions that, when executed by the computer network device, causes the computer network device to perform operations comprising:
receiving a report message that is associated with a host, which indicates that the host wants to join a group in a network that receives an audio-video channel from a source;
adding, based at least in part on the report message, information associated with the host to a group data structure that comprises information associated with one or more hosts in the group;
when the computer network device receives a leave message that is associated with the host, removing or deactivating the host from the group data structure;
selectively flooding the report message or the leave message within the network on non-edge ports in the network, wherein the report message or the leave message is not forwarded to edge ports in the network associated with the one or more hosts or the source; and
when the group data structure is empty or has no active hosts, stopping forwarding of the audio-video channel from the source to the group without further delay.

15. The non-transitory computer-readable storage medium of claim 14, wherein the computer network device implements an Internet group management protocol version 2 (IGMPv2).

16. The non-transitory computer-readable storage medium of claim 14, the computer network device stops the forwarding of the audio-video channel from the source without first providing a group-specific query message addressed to the one or more hosts in the group.

17. A method for performing host tracking, comprising:
by a computer network device:
receiving a report message that is associated with a host, which indicates that the host wants to join a group in a network that receives an audio-video channel from a source;
adding, based at least in part on the report message, information associated with the host to a group data structure that comprises information associated with one or more hosts in the group;
when the computer network device receives a leave message that is associated with the host, removing or deactivating the host from the group data structure;
selectively flooding the report message or the leave message within the network on non-edge ports in the network, wherein the report message or the leave message is not forwarded to edge ports in the network associated with the one or more hosts or the source; and
when the group data structure is empty or has no active hosts, stopping forwarding of the audio-video channel from the source to the group without further delay.

18. The method of claim 17, wherein the computer network device comprises a switch or a router.

19. The method of claim 17, wherein the operations comprise providing the report message or the leave message to one or more other computer network devices in the network via the non-edge ports.

20. The method of claim 17, wherein the method comprises dynamically determining the non-edge ports in the network and the edge ports in the network associated with the one or more hosts or the source.

* * * * *